(12) United States Patent
Goldsmith et al.

(10) Patent No.: US 9,703,715 B2
(45) Date of Patent: Jul. 11, 2017

(54) SHARED MEMORY IN A SECURE PROCESSING ENVIRONMENT

(71) Applicant: Intel Corporation, Santa Clara, CA (US)

(72) Inventors: Michael A. Goldsmith, Lake Oswego, OR (US); Simon P. Johnson, Beaverton, OR (US); Carlos V. Rozas, Portland, OR (US); Vincent R. Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 14/142,838

(22) Filed: Dec. 28, 2013

(65) Prior Publication Data

US 2015/0186272 A1    Jul. 2, 2015

(51) Int. Cl.
| | | |
|---|---|---|
| *G06F 12/00* | (2006.01) | |
| *G06F 12/084* | (2016.01) | |
| *G06F 12/14* | (2006.01) | |
| *G06F 9/46* | (2006.01) | |
| *G06F 21/60* | (2013.01) | |
| *G06F 21/71* | (2013.01) | |
| *G06F 21/79* | (2013.01) | |

(52) U.S. Cl.
CPC ............ *G06F 12/084* (2013.01); *G06F 9/468* (2013.01); *G06F 12/1483* (2013.01); *G06F 21/606* (2013.01); *G06F 21/71* (2013.01); *G06F 21/79* (2013.01); *G06F 2212/608* (2013.01); *G06F 2221/2141* (2013.01)

(58) Field of Classification Search
CPC ....... G06F 2212/608; G06F 2221/2141; G06F 12/084; G06F 21/71; G06F 21/606; G06F 12/1483; G06F 9/468; G06F 21/79
See application file for complete search history.

(56) References Cited

U.S. PATENT DOCUMENTS

| | | | | | |
|---|---|---|---|---|---|
| 5,265,227 | A * | 11/1993 | Kohn | .................. | G06F 12/1027 711/164 |
| 6,766,434 | B2 * | 7/2004 | Gaertner | ............. | G06F 12/1027 711/130 |
| 7,146,477 | B1 * | 12/2006 | Strongin | ............. | G06F 12/1475 709/229 |
| 7,219,369 | B2 * | 5/2007 | Hashimoto | ......... | G06F 12/1475 711/163 |

(Continued)

OTHER PUBLICATIONS

European Search Report received for European Patent Application No. 14194759.8 mailed on Mar. 16, 2015, 8 pages of European Search Report.

(Continued)

*Primary Examiner* — David X Yi
*Assistant Examiner* — Francisco Grullon
(74) *Attorney, Agent, or Firm* — Nicholson De Vos Webster & Elliott, LLP (57) ABSTRACT

Embodiments of an invention for sharing memory in a secure processing environment are disclosed. In one embodiment, a processor includes an instruction unit and an execution unit. The instruction unit is to receive an instruction to match an offer to make a page in an enclave page cache shareable to a bid to make the page shareable. The execution unit is to execute the instruction. Execution of the instruction includes making the page shareable.

18 Claims, 5 Drawing Sheets

(56) References Cited

U.S. PATENT DOCUMENTS

| | | | |
|---|---|---|---|
| 2005/0050296 A1* | 3/2005 | Kottapalli | G06F 12/1054 |
| | | | 711/207 |
| 2007/0239953 A1* | 10/2007 | Savagaonkar | G06F 12/1483 |
| | | | 711/163 |
| 2010/0031370 A1* | 2/2010 | Ellison | G06F 21/575 |
| | | | 726/27 |
| 2012/0017029 A1* | 1/2012 | Santos | G06F 12/1081 |
| | | | 711/6 |
| 2012/0159184 A1* | 6/2012 | Johnson | G06F 12/1466 |
| | | | 713/189 |
| 2013/0031364 A1* | 1/2013 | Glew | G06F 21/72 |
| | | | 713/162 |
| 2013/0036314 A1* | 2/2013 | Glew | G06F 12/1408 |
| | | | 713/194 |
| 2015/0033034 A1* | 1/2015 | Gerzon | H04L 9/3239 |
| | | | 713/190 |

OTHER PUBLICATIONS

Koldinger E J et al., "Architectural Support for Single Address Space Operating Systems", Principles of Programming Languages, vol. 27, No. 9, Sep. 1, 1992, pp. 175-186, ISSN: 0362-1340, ACM, 2 Penn Plaza, Suite 701 New York NY 10121-0701 USA.

Witchel E et al., "Mondrian Memory Protection", Principles of Programming Languages, vol. 37, No. 10, Oct. 1, 2002, pp. 304-316, ISSN: 0362-1340, ACM, 2 Penn Plaza, Suite 701 New York NY 10121-0701 USA.

Office Action Received for European patent Application No. EP14194759.8 mailed on Mar. 9, 2016, 6 pages of Office Action.

* cited by examiner

FIGURE 2

FIGURE 4
ARCHITECTURE 400

FIGURE 5
METHOD 500

SHARED MEMORY IN A SECURE PROCESSING ENVIRONMENT

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated container, partition, or environment within an information processing system.

BRIEF DESCRIPTION OF THE FIGURES

The present invention is illustrated by way of example and not limitation in the accompanying figures.

DETAILED DESCRIPTION

Embodiments of an invention for shared memory in a secure processing environment are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, various approaches to creating and maintaining a secured, protected, or isolated container, partition, or environment within an information processing system have been developed. One such approach involves secure enclaves as described in the co-pending U.S. Patent Applications entitled "Method and Apparatus to Provide Secure Application Execution," filed Jun. 19, 2012, Ser. No. 13/527,547; "Paging in Secure Enclaves," filed Dec. 28, 2012, Ser. No. 13/727,277; "Memory Management in Secure Enclaves," filed Dec. 28, 2012, Ser. No. 13/729,371; and "Instructions and Logic to Provide Advanced Paging Capabilities for Secure Enclave Page Caches," filed Mar. 31, 2012, Ser. No. 13/854,107; which provide information regarding at least one embodiment of a secured, protected, or isolated container, partition, or environment. However, these references are not intended to limit the scope of embodiments of the invention in any way and other embodiments may be used while remaining within the spirit and scope of the present invention. Therefore, any instance of any secured, protected, or isolated container, partition, or environment used in any embodiment of the present invention may be referred to herein as a secure enclave or an enclave.

Embodiments of the present invention provide for sharing memory between or among more than one secure enclave. Secure enclave usage models in which these embodiments may be desired include a root enclave that spawns other enclaves, a library enclave that contains libraries for use by other enclaves, and an enclave that exchanges information with other enclaves.

Figure 1:
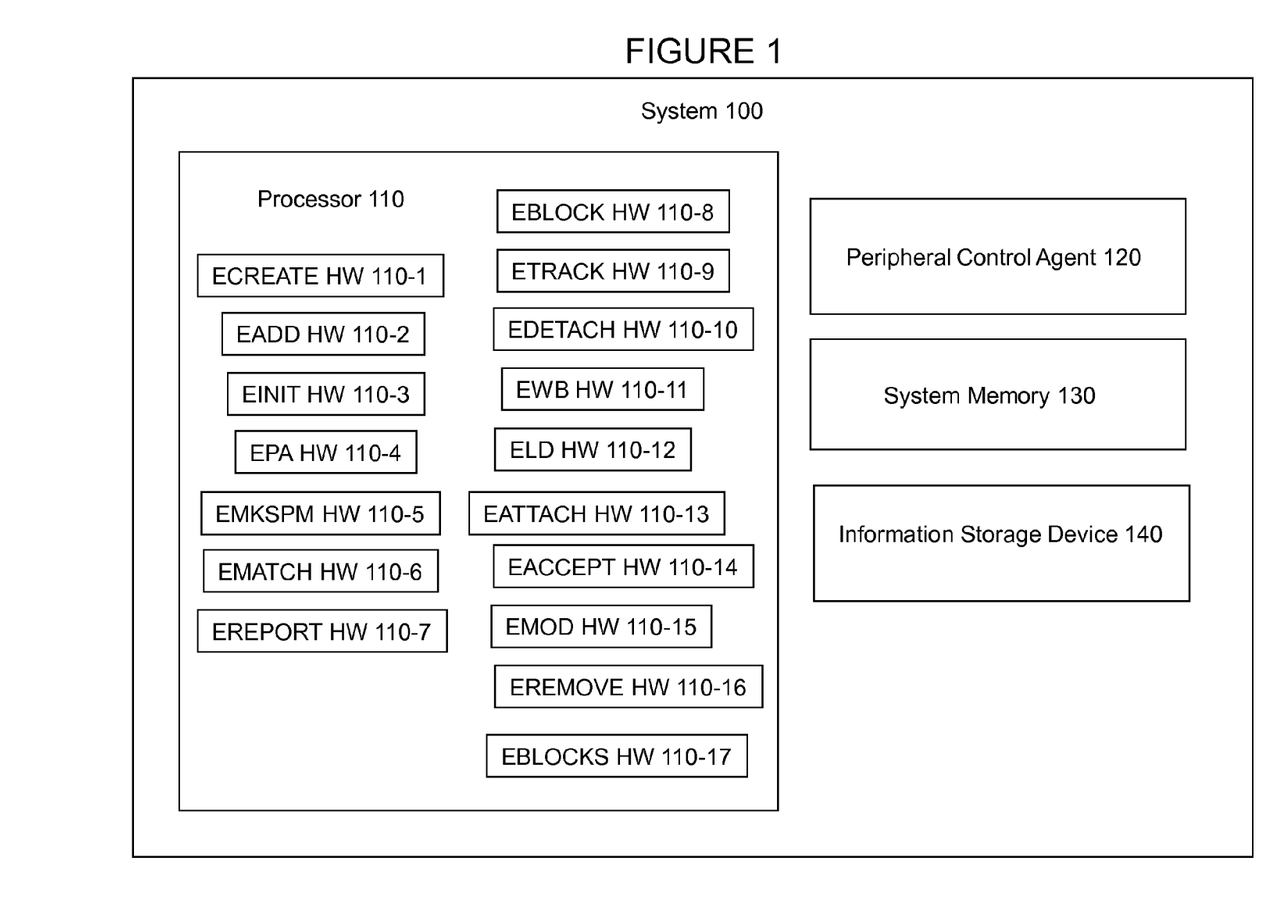
FIG. 1 illustrates a system providing for shared memory in a secure processing environment according to an embodiment of the present invention.

FIG. 1 illustrates system 100, an information processing system providing for shared memory in a secure processing environment according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, peripheral control agent 120, system memory 130, and information storage device 140. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

Peripheral control agent 120 may represent any component, such as a chipset component, including or through which peripheral, input/output, or other components or devices may be connected or coupled to processor 110. System memory 130 may be dynamic random access memory or any other type of medium readable by processor 110. Information storage device 140 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

Processor 110 may operate according to an instruction set architecture that includes a first instruction to create a secure enclave, a second instruction to add content to an enclave, a third instruction to initialize an enclave, a fourth instruction to allocate a special page, a fifth instruction to create a shared page metadata (an SPM, as described below), a sixth instruction to populate an SPM, a seventh instruction to generate a report of an enclave's content and/or identity, an eighth instruction to prevent the creation of new translations to access a shared page, a ninth instruction to track sharing of a page, a tenth instruction to detach mappings to a page, an eleventh instruction to evict a page from an enclave page cache (an EPC, as described below), a twelfth instruction to load a page into an EPC, a thirteenth instruction to re-attach an SPM to a shared page, an fourteenth instruction to accept the allocation of a page to an enclave, a fifteenth instruction to modify the access rights to a page, a sixteenth instruction to de-allocate a page from an enclave, and a seventeenth instruction to prevent the creation of new translations to access a shared special page. Although embodiments of the present invention may be practiced with a processor having any instruction set architecture and are not limited to the architecture of a processor family from Intel® Corporation, the instructions may be part of a set of software protection extensions to an existing architecture, and may be referred to herein as an ECREATE instruction, an EADD instruction, and EINIT instruction, an EPA instruction, an EMKSPM instruction, an EMATCH instruction, an EREPORT instruction, an EBLOCK instruction, an ETRACK instruction, an EDETACH instruction, and EWB instruction, an ELD instruction, an EATTACH instruction, an EACCEPT instruction, and EMOD instruction, an EREMOVE instruction, and an EBLOCKS instruction, respectively. Support for these instructions may be implemented in a processor using any combination of circuitry and/or logic embedded in hardware, microcode, firmware, and/or other structures arranged as described below or according to any other approach, and is represented in FIG. 1 as ECREATE hardware 110-1, EADD hardware 110-2, EINIT hardware 110-3, EPA hardware 110-4, EMKSPM hardware 110-5, EMATCH hardware 110-6, EREPORT hardware 110-7, EBLOCK hardware 110-8, ETRACK hardware 110-9, EDETACH hardware 110-10, EWB hardware 110-11, ELD hardware 110-12, EATTACH hardware 110-13, EACCEPT hardware 110-14, EMOD hardware 110-15, EREMOVE hardware 110-16, and EBLOCKS hardware 110-17.

Figure 2:
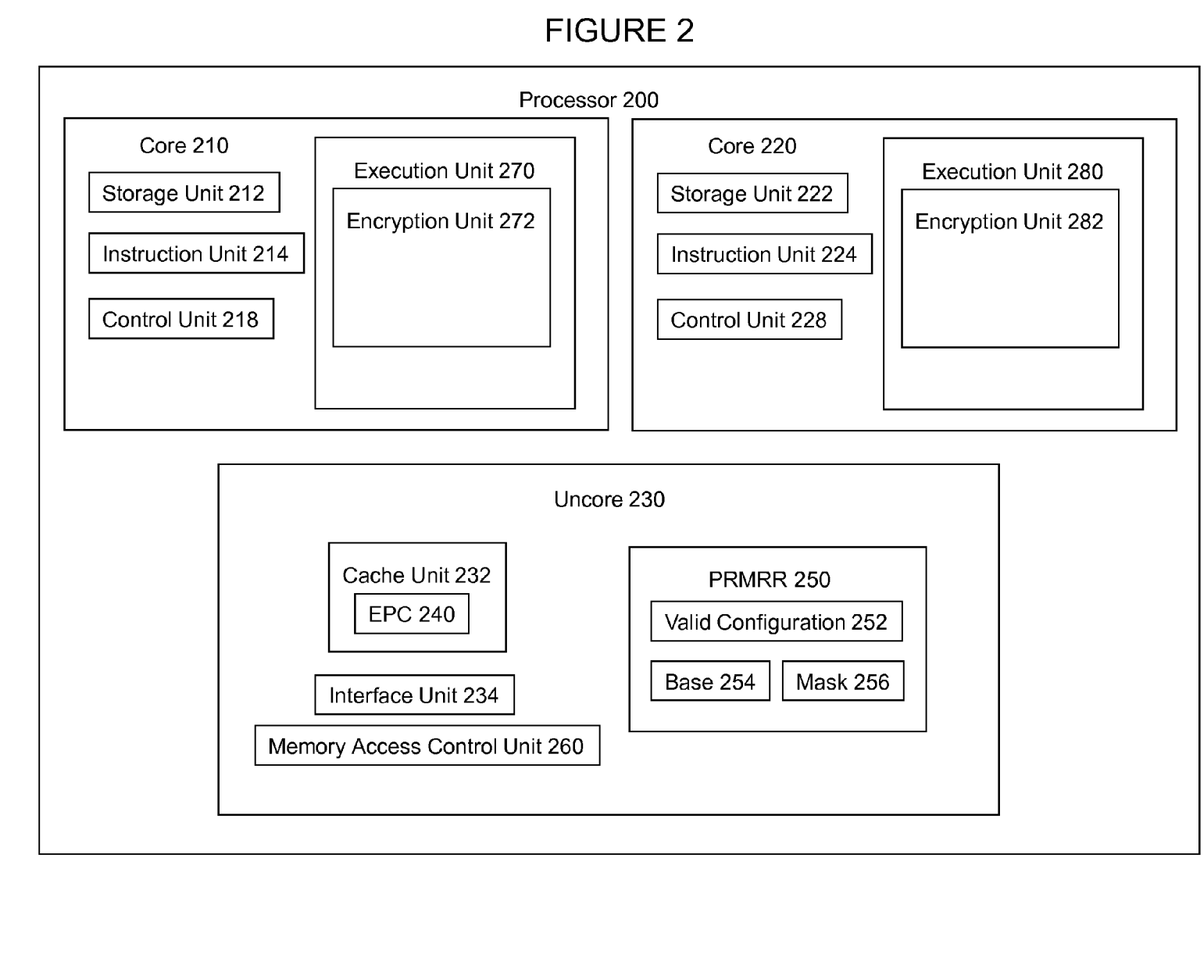
FIG. 2 illustrates a processor providing for shared memory in a secure processing environment according to an embodiment of the present invention.

FIG. 2 illustrates processor 200, an embodiment of which may serve as processor 110 in system 100. Processor 200 may include core 210, core 220, and uncore 230. Core 210 may include storage unit 212, instruction unit 214, execution unit 270, and control unit 218. Core 220 may include storage unit 222, instruction unit 224, execution unit 280, and control unit 228. Uncore 230 may include cache unit 232, interface unit 234, processor reserved memory range registers 250, and memory access control unit 260. Processor 200 may also include any other circuitry, structures, or logic not shown in FIG. 2. The functionality of ECREATE hardware 110-1, EADD hardware 110-2, EINIT hardware 110-3, EPA hardware 110-4, EMKSPM hardware 110-5, EMATCH hardware 110-6, EREPORT hardware 110-7, EBLOCK hardware 110-8, ETRACK hardware 110-9, EDETACH hardware 110-10, EWB hardware 110-11, ELD hardware 110-12, EATTACH hardware 110-13, EACCEPT hardware 110-14, EMOD hardware 110-15, EREMOVE hardware 110-16, and EBLOCKS hardware 110-17, as introduced above and further described below, may be contained in or distributed among any of the labeled units or elsewhere in processor 200.

Storage units 212 and 222 may include any combination of any type of storage usable for any purpose within cores 210 and 220, respectively; for example, they may include any number of readable, writable, and/or read-writable registers, buffers, and/or caches, implemented using any memory or storage technology, for storing capability information, configuration information, control information, status information, performance information, instructions, data, and any other information usable in the operation of cores 210 and 220, respectively, as well as circuitry usable to access such storage.

Instruction units 214 and 224 may include any circuitry, logic, structures, and/or other hardware for fetching, receiving, decoding, interpreting, and/or scheduling instructions to be executed by cores 210 and 220, respectively. Any instruction format may be used within the scope of the present invention; for example, an instruction may include an opcode and one or more operands, where the opcode may be decoded into one or more micro-instructions or micro-operations for execution by execution unit 216 or 226, respectively. Instructions, such as those referred to above, may be leaves of a single opcode, such as a privileged secure enclave opcode (e.g., ENCLS) or an unprivileged secure enclave opcode (e.g., ENCLU), where the leaf instructions are specified by the value in a processor register (e.g., EAX). Operands or other parameters may be associated with an instruction implicitly, directly, indirectly, or according to any other approach.

Execution units 270 and 280 may include any circuitry, logic, structures, and/or other hardware, such as arithmetic units, logic units, floating point units, shifters, etc., for processing data and executing instructions, micro-instructions, and/or micro-operations. Execution units 270 and 280 may include encryption units 272 and 282, respectively, which may represent any circuitry, logic, structures, and/or other hardware to execute any one or more encryption algorithms and the corresponding decryption algorithms using circuitry, logic, structures, and/or other hardware dedicated to encryption/decryption or shared within execution units 270 and 280 or elsewhere in processor 200 to perform other functions.

Control units 218 and 228 may include any microcode, firmware, circuitry, logic, structures, and/or other hardware to control the operation of the units and other elements of cores 210 and 220, respectively, and the transfer of data within, into, and out of cores 210 and 220. Control units 218 and 228 may cause cores 210 and 220 and processor 200 to perform or participate in the performance of method embodiments of the present invention, such as the method embodiments described below, for example, by causing cores 210 and 220 to execute instructions received by instruction units 214 and 224 and micro-instructions or micro-operations derived from instructions received by instruction units 214 and 224.

Cache unit 232 may include any number of cache arrays and cache controllers in one or more levels of cache memory in a memory hierarchy of information processing system 100, implemented in static random access memory or any other memory technology. Cache unit 232 may be shared among any number of cores and/or logical processors within processor 200 according to any approach to caching in information processing systems. Cache unit 232 may also include one or more memory arrays to be used as enclave page cache (EPC) 240 as further described below.

Interface unit 234 may represent any circuitry, logic, structures, and/or other hardware, such as a link unit, a bus unit, or a messaging unit to allow processor 200 to communicate with other components in a system such as system 200 through any type of bus, point to point, or other connection, directly or through any other component, such as a bridge, hub, or chipset. Interface unit 234 may include one or more integrated memory controllers to communicate with a system memory such as system memory 130 or may communicate with a system memory through one or more memory controllers external to processor 200.

Processor reserved memory range registers (PRMRR) 250 may represent any one or more storage locations in storage units 212 and 222, elsewhere in processor 200, and/or copies thereof in uncore 230. PRMRR 250 may be used, for example by configuration firmware such as a basic input/output system, to reserve one or more physically contiguous ranges of memory called processor reserved memory (PRM). Memory access control unit 260 may represent any circuitry, structures, logic, and/or other hardware anywhere in processor 200 that may control access to PRM such that EPC 240 may be created within the system memory space defined as PRM.

In an embodiment, PRM is of a size that is an integer power of two, e.g. 32 MB, 64 MB, or 128 MB, and is aligned to a memory address that is a multiple of that size. PRMRR 250 may include one or more instances of a read-only PRMMR valid configuration register 252 to indicate the valid sizes to which PRM may be configured, one or more instances of a PRMMR base register 254 and a PRMMR mask register 256 to define one or more base addresses and ranges of PRM.

EPC 240 is a secure storage area in which software may be protected from attacks by malware operating at any privilege level. One or more secure enclaves may be created such that each enclave may include one or more pages or other regions of EPC 240 in which to store code, data, or other information in a way that it may only be accessed by software running inside that enclave, except according to embodiments of the present invention. For example, a secure enclave may be used by a software application so that only that software application, while running inside that enclave, may access the contents of that enclave, except according to embodiments of the present invention. Except according to embodiments of the present invention, no other software, not even an operating system or a virtual machine monitor, may read the unencrypted contents of that enclave, modify the contents of that enclave, or otherwise tamper with the contents of that enclave while the content is loaded into the EPC (assuming that the enclave is a production enclave, as opposed to, for example, a debug enclave). However, the contents of the enclave may be accessed by software executing from within that enclave on any processor in system 100. This protection is accomplished by the memory access control unit 260 operating according to the secure enclaves architecture.

In FIG. 2, EPC 240 is shown in cache unit 232, where it may be a sequestered portion of a shared cache or a dedicated memory. Within or on the same die as processor 200, EPC 240 may be implemented in static random access memory, embedded dynamic random access memory, or any other memory technology. EPC 240 may also or additionally be implemented external to processor 200, for example within a secure region of system memory 130. To protect the content of secure enclaves when it is not stored on-die, encryption units 272 and/or 282 may be used to encrypt the content before it is transferred off-die and to decrypt the content transferred back into EPC 240 on-die. Other protection mechanisms may also be applied to protect the content from replay and other attacks.

Figure 3:
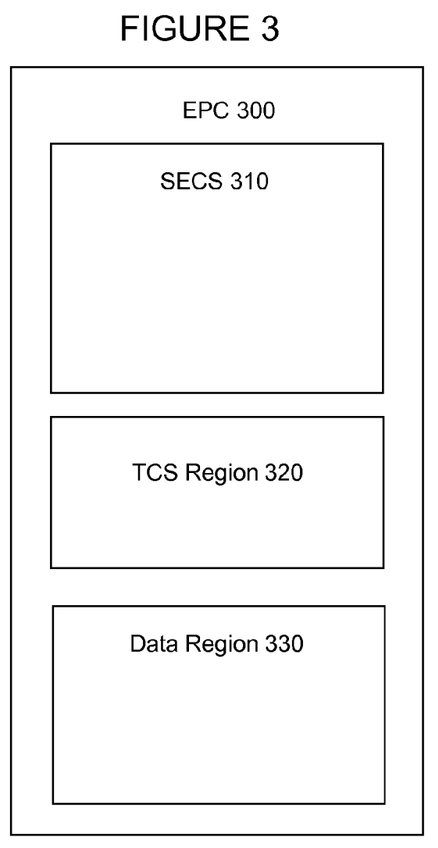
FIG. 3 illustrates an enclave page cache according to an embodiment of the present invention.

FIG. 3 illustrates EPC 300, an embodiment of which may serve as EPC 240 in FIG. 2. In FIG. 3, EPC 300 includes secure enclave control structure (SECS) 310, thread control structure (TCS) region 320, and data region 330. Although FIG. 3 shows EPC 300 divided into three separate regions, EPC 300 may be divided into any number of chunks, regions, or pages, each of which may be used for any type of content. In one embodiment, it is divided into 4 kilobyte (KB) pages and is aligned to an address in system memory 130 that is a multiple of 4 KB, SECS 310 may be any one of the 4 KB pages in EPC 300, TCS region 320 may be any number of contiguous or non-contiguous 4 KB pages, and data region 330 may be any number of contiguous or non-contiguous 4 KB pages. Furthermore, although FIG. 3 shows one SECS, one TCS region, and one data region corresponding to one secure enclave, an EPC may include any number of SECS and any number of TCS and data regions, so long as each enclave has one and only one SECS, each valid TCS and valid data region (e.g., page) belongs to one and only one enclave, and all of the SECS, TCS, and data pages fit within the EPC (or may be paged out of and back into the EPC).

An SECS may created by the execution of an ECREATE instruction to contain metadata to be used by hardware, and accessible only by hardware (i.e., not readable, writable, or otherwise accessible by software, whether running inside or outside the enclave), to define, maintain, and protect the enclave. One or more TCSs may also be associated with a secure enclave. A TCS contains metadata used by the hardware to save and restore thread specific information when entering and exiting the enclave.

The security attributes of each page are stored in a micro-architectural data structure called an enclave page cache map (EPCM) that is used by memory access control unit 260 to enforce the protections provided by the secure enclaves architecture. The EPCM stores one entry for each page in the EPC. Each entry includes an identifier (e.g., a 64 bit field) of the SECS (i.e., the enclave) to which the page belongs. These identifiers may be referred to by secure enclaves instructions (e.g., the address of the SECS may be stored in a register such as RCX, the address of a micro-architectural data structure including the address of the SECS may be stored in a register such as RBX, etc.) to provide for the SECS to be read by hardware in order to execute the instruction.

Figure 4:
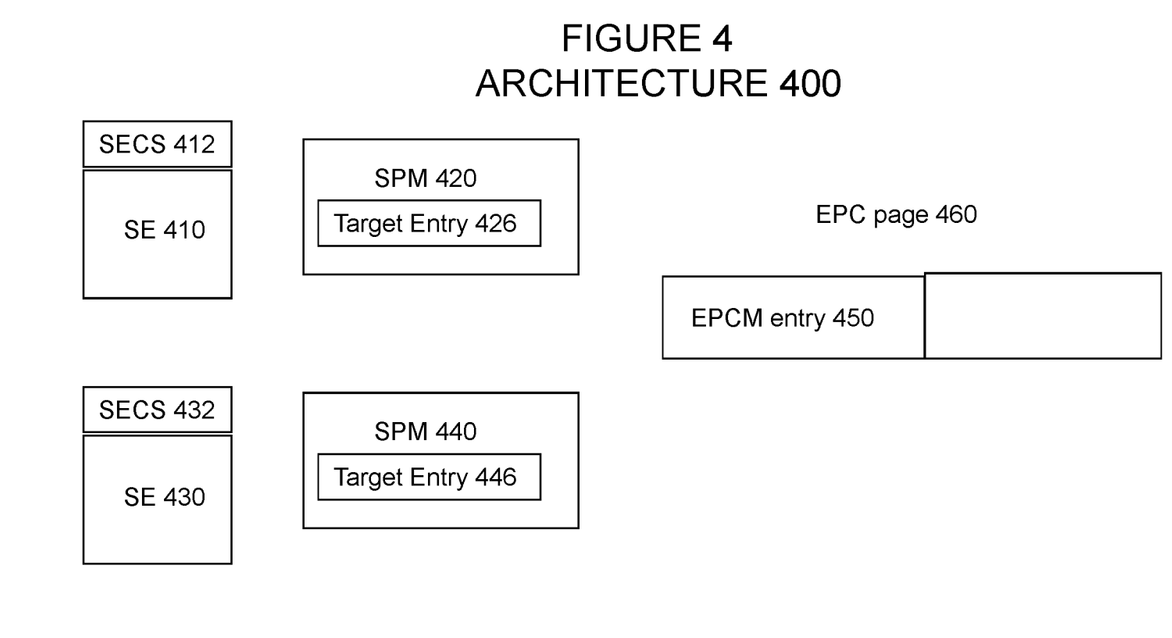
FIG. 4 illustrates an architecture including shared memory in a secure processing environment according to an embodiment of the present invention

FIG. 4 illustrates architecture 400, an architecture for sharing memory in a secure processing environment according to an embodiment of the present invention. In one embodiment, architecture 400 includes secure enclave 410, SECS 412, SPM 420, secure enclave 430, SECS 432, SPM 440, EPCM entry 450, and EPC page 460.

An SPM, such as SPM 420 and SPM 440, is a data structure providing for maintaining metadata on a per-share basis to allow sharing of memory according to an embodiment of the present invention. Metadata in each SPM refers to a shared page. For example, target entry 426 in SPM 420 and target entry 446 in 440 both refer to EPC page 460 to allow EPC page 460 to be shared by enclave 410 and 430.

SPMs are stored in an EPC page having a special page type called PT_SPMA (SPM array). An SPMA page may be created using an EPA instruction, and in an embodiment, may contain an array of 128 SPMs, each 32 bytes. Each SPMA page belongs to a single, specific enclave; in other words, every SPM within the same SPMA refers to EPC pages within one specific enclave that may be shared with other enclaves. In an embodiment, each SPMA is referred to by a 128-page aligned linear address stored in a corresponding EPCM entry, such that the page miss handler that enforces the access control of the page needs to check only 63:19 or 31:19 of the linear address. An SPMA page may be paged, with EBLOCK and ETRACE instructions being used to avoid race.

An EMKSPM instruction may be used to create SPMs for an EPC page to be shared. A first invocation of an EMKSPM instruction may be used to create a first SPM for an EPC page, which designates the page as shareable. A second (or third, etc.) invocation of an EMKSPM instruction may be used to create a second (or third, etc.) SPM for the same EPC page, which designates the page as shared. The EMKSPM instruction changes the designation of the page, but does not change the security properties of the page (an EMATCH instruction may be used to do that, as described below), so it does not require the co-operation of one of the enclaves that will share the page. For example, it may be executed by an operating system running at ring-0 privilege level outside of the enclaves that will share the page.

An EMATCH instruction may be used to populate an SPM entry. An EMATCH instruction may have an associated OFFER parameter and an associated BID parameter. The OFFER parameter may be created, by an enclave offering to share a page (the sharing enclave), to specify the linear address of the page to be shared, the permissions (e.g. read, write, and/or execute), and the identity of the enclave with which the page is to be shared. The BID parameter may be created, by an enclave desiring an offer to share a page (the receiving enclave), to specify a linear address to which the page is to be mapped within that enclave's address space, the desired permissions, and the identity of the sharing enclave. The receiving enclave and the sharing enclave may authenticate each other using EREPORT instructions before creating the BID and the OFFER, and both parameters may be created in a page having a special page type called PT_SPRM (secure parameter) to prevent the BID and the OFFER from being spoofed. Operating system or other software may then use the EMATCH instruction to create the share.

After the share has been created, the page miss handler enforces the access permissions as it does for unshared pages, except that it also allows the receiving enclave to access the page according to the permissions set for it by the EMATCH instruction.

Shared pages may be paged out of the EPC by executing an EBLOCK instruction for each linear address mapped to the page to set the BLOCK and BEPOCH in bits each corresponding SPM, an ETRACK instruction for each SECS for each corresponding enclave, an EDETACH instruction (as described below) for each linear address mapped to the page in each corresponding SPM, and when ready (as described below) an EWB instruction to evict the page. Execution of the EDETACH instruction includes checking whether the corresponding SPM and SECS are in a state indicating that the page is ready to be evicted, and if ready, decrements a corresponding reference count in the EPCM and clears a valid bit in the SPM and the corresponding target page address. The page is ready to be evicted using the EWB instruction when the reference count in the EPCM reaches zero.

The page may be paged back into the EPC using the ELD instruction according to the paging process for an unshared page, along with the EATTACH instruction to re-attach the mapping of each additional linear address in each corresponding SPM to the page (e.g., the page identifier in the SPM must match the page identifier in the EPCM). Also, the operating system updates the page table entry for each such address.

To unshare a page (i.e., remove the sharing of a shared page), an enclave uses the EMOD and EACCEPT instructions to ensure page removal, and then a process similar to preparing an EPC for eviction is followed. The EBLOCK and ETRACK protocol is used on all shares to prepare for the possibility of a stale translation, and an EDETACH instruction is executed for all shares. When all shares have been detached, as indicated by the reference count reaching zero, the page may be removed using an EREMOVE instruction.

Also, SPMA pages may be paged out using an EBLOCKS instruction. The EBLOCK and ETRACK instructions are used to ensure that there is no race with the page miss handler, then the EBLOCKS instruction is used to block the entire SPMA page before paging it out.

Figure 5:
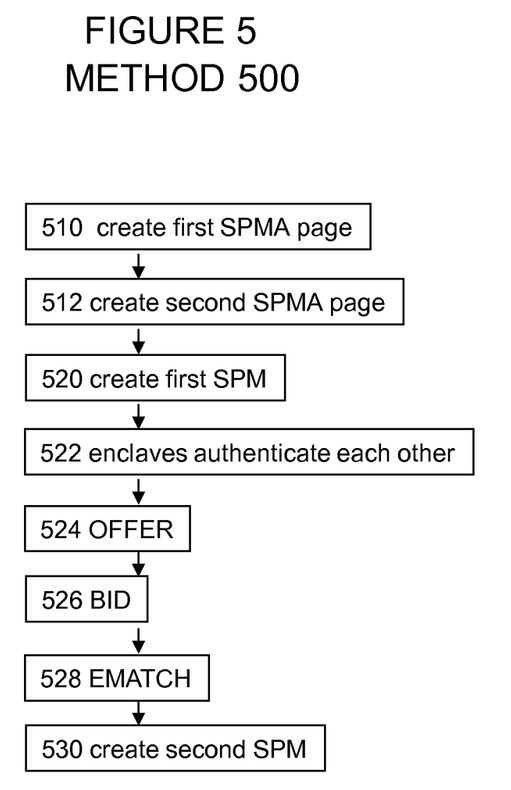
FIG. 5 illustrates a method for sharing memory in a secure processing environment according to an embodiment of the present invention.

FIG. 5 illustrates method 500, a method for sharing memory in a secure processing environment according to an embodiment of the present invention. Although method embodiments of the invention are not limited in this respect, reference may be made to elements of FIGS. 1, 2, 3, and 4 to help describe the method embodiment of FIG. 5. Method 500 may reference secured enclaves created, built, and initialized using ECREATE, EADD, and EINIT instructions; however, embodiments of the present invention are not limited to these or any other specifically named instructions.

In box 510 of method 500, a first SPMA page for a first enclave is created using an EPA instruction. In box 512, a second SPMA page for a second enclave is created using an EPA instruction.

In box 520, a first SPM is created for a page for the first enclave using an EMKSPM instruction, making the page shareable. In box 522, the first and second enclaves authenticate each other using EREPORT. In box 524, the first enclave creates an OFFER in enclave memory. In box 526, the second enclave creates a BID in enclave memory. In box 528, an EMATCH instruction is executed. In box 530, a second SPM is created for the page for the second enclave, making the page shared.

In various embodiments of the present invention, the method illustrated in FIG. 5 may be performed in a different order, with illustrated boxes combined or omitted, with additional boxes added, or with a combination of reordered, combined, omitted, or additional boxes. Furthermore, method embodiments of the present invention are not limited to method 500 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 500 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for sharing memory in a secure processing environment have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
instruction circuitry to receive a first instruction, the first instruction having an offer parameter, a bid parameter, and permissions, the offer parameter to be created by a first enclave to make a page in an enclave page cache shareable to a second enclave according to the permissions, the bid parameter to be created by the second enclave to specify a linear address to which the page is to be mapped within the second enclave;
execution circuitry to execute the first instruction, wherein execution of the first instruction includes making the page shareable; and
memory access control circuitry including a page miss handler to allow the second enclave to access the page according to the permissions.

2. The processor of claim 1, wherein the instruction unit is also to receive a second instruction to create a shared page metadata array and the execution unit is also to execute the second instruction.

3. The processor of claim 2, wherein the instruction unit is also to receive a third instruction to create a shared page metadata and the execution unit is also to execute the third instruction.

4. The processor of claim 3, wherein execution of the first instruction also includes populating the shared page metadata.

5. The processor of claim 4, wherein the instruction unit is also to receive a fourth instruction to prevent creation of new translations to access the page and the execution unit is also to execute the fourth instruction.

6. The processor of claim 5, wherein the instruction unit is also to receive a fifth instruction to track sharing of the page and the execution unit is also to execute the fifth instruction.

7. The processor of claim 6, wherein the instruction unit is also to receive a sixth instruction to detach mappings to the page and the execution unit is also to execute the sixth instruction.

8. The processor of claim 7, wherein the instruction unit is also to receive a seventh instruction to re-attach the shared page metadata to the page and the execution unit is also to execute the seventh instruction.

9. A method comprising:
creating, in an enclave page cache, a first shared page metadata for a page for a first enclave to make the page shareable;
matching an offer by a first enclave to make the page in the enclave page cache (EPC) shareable to a bid to make the page shareable with a second enclave by executing an instruction having an offer parameter created by the first enclave and a bid parameter created by the second enclave to specify a linear address to which the page is to be mapped within the second enclave; and
making the page shared by creating a second page metadata for the page for the second enclave.

10. The method of claim 9, further comprising creating a shared page metadata array.

11. The method of claim 10, further comprising populating the first shared page metadata.

12. The method of claim 11, further comprising preventing creation of new translations to access the page.

13. The method of claim 12, further comprising tracking sharing of the page.

14. The method of claim 13, further comprising detaching mappings to the page.

15. The method of claim 14, further comprising evicting the page from the EPC.

16. The method of claim 15, further comprising re-loading the page into the EPC.

17. The method of claim 9, further comprising authenticating, by the enclave that created the offer, the enclave that created the bid.

18. A system comprising:
a memory; and
a processor including
an instruction unit to receive a first instruction, the first instruction having an offer parameter, a bid parameter, and permissions, the offer parameter to be created by a first enclave to make a page in an enclave page cache of the memory shareable to a second enclave according to the permissions, the bid parameter to be created by the second enclave to specify a linear address to which the page is to be mapped within the second enclave;
an execution unit to execute the first instruction, wherein execution of the first instruction includes making the page shareable; and
a memory access control unit including a page miss handler to allow the second enclave to access the page according to the permissions.

* * * * *